United States Patent [19]
Kanao

[11] Patent Number: 5,802,925
[45] Date of Patent: Sep. 8, 1998

[54] MICROSCOPE STAGE

[75] Inventor: Masato Kanao, Tanashi, Japan

[73] Assignee: Olympus Optical Co., Ltd., Tokyo, Japan

[21] Appl. No.: 733,200

[22] Filed: Oct. 21, 1996

[30] Foreign Application Priority Data

Oct. 23, 1995 [JP] Japan ................................. 7-274393

[51] Int. Cl.⁶ ........................... B02B 21/26; F16H 19/06; G05G 11/00
[52] U.S. Cl. .................... 74/490.13; 74/89.22; 108/143; 248/661; 359/393
[58] Field of Search .............................. 74/89.22, 490.09, 74/490.13; 108/143; 248/661; 359/393

[56] References Cited

U.S. PATENT DOCUMENTS

| | | | |
|---|---|---|---|
| 4,189,953 | 2/1980 | Volk | 74/479 |
| 4,552,033 | 11/1985 | Marzhauser | 74/490.13 |
| 4,615,592 | 10/1986 | Schob et al. | 359/393 |
| 4,700,585 | 10/1987 | Marzhauser | 74/490.13 |
| 5,228,357 | 7/1993 | Dosaka | 108/143 X |

FOREIGN PATENT DOCUMENTS

| | | | |
|---|---|---|---|
| 226091 | 8/1985 | Germany | 359/393 |
| 61-198206 | 9/1986 | Japan . | |

*Primary Examiner*—Allan D. Herrmann
*Attorney, Agent, or Firm*—Frishauf, Holtz, Goodman, Langer & Chick

[57] ABSTRACT

A microscope stage comprising an upper stage and a lower stage provided on a preset microscope and overlapped on each other in a vertical direction, said upper stage being disposed to move in a straight direction with respect to said lower stage, a pair of pulleys disposed on one of said upper stage and said lower stage and arranged with a preset distance in a direction parallel to the movement direction of said upper stage, and an endless driving force transmission member stretched between said pair of pulleys and reciprocally moved between said pulleys.

17 Claims, 13 Drawing Sheets

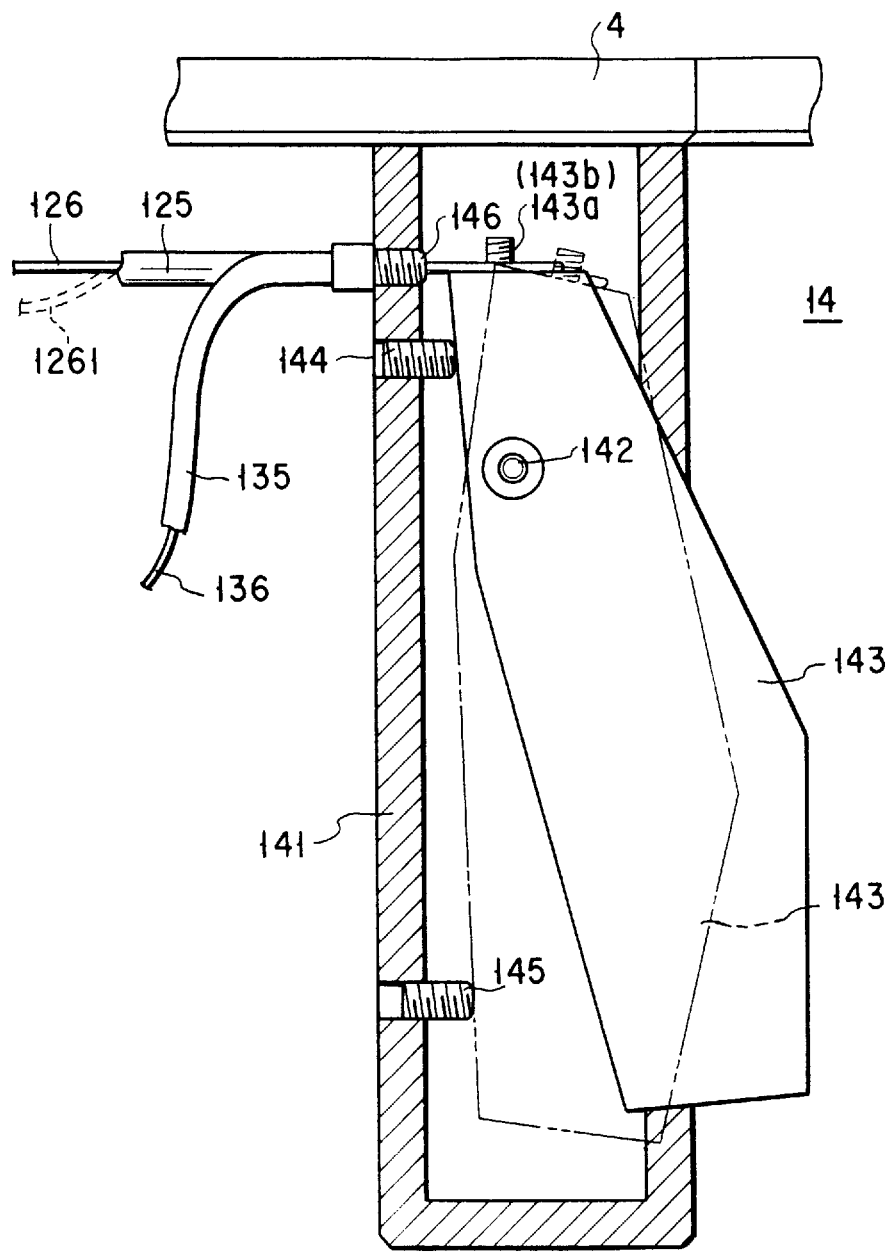
F I G. 5

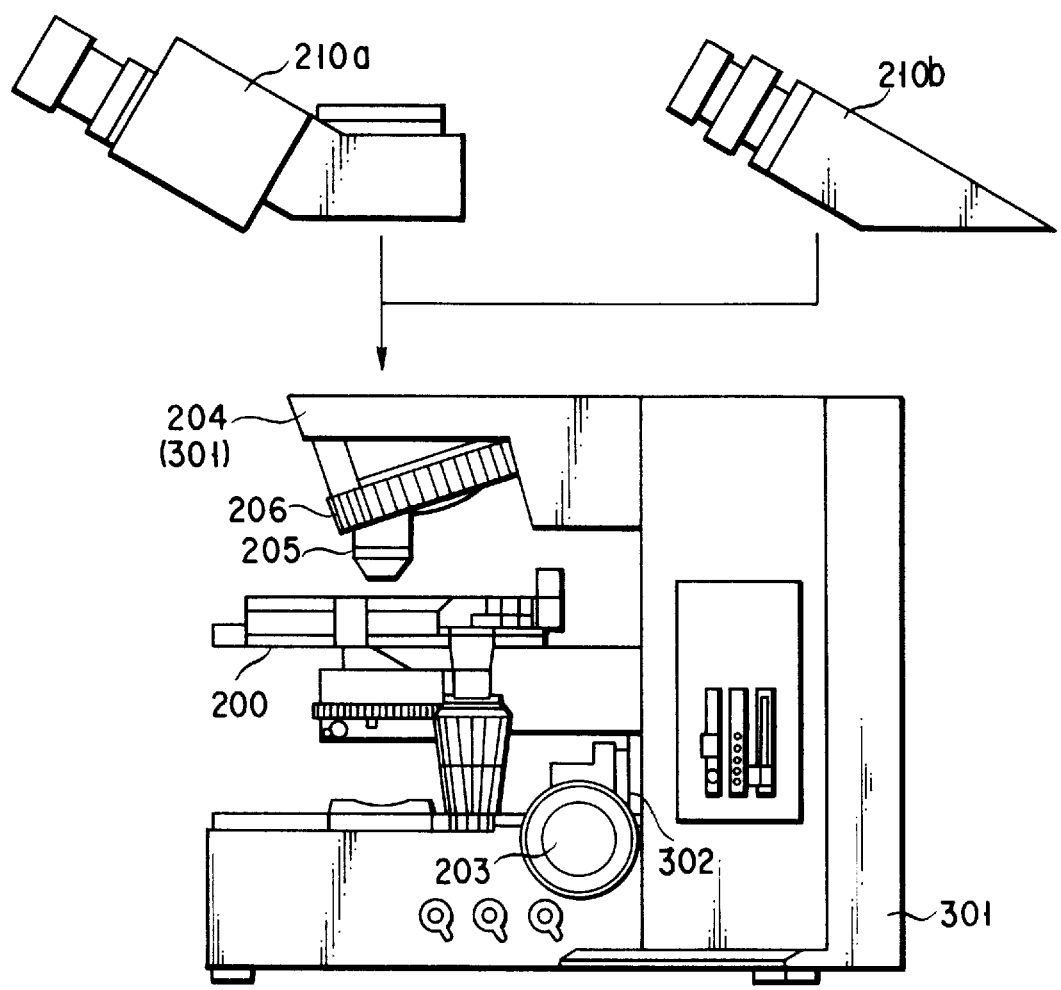
F I G. 12

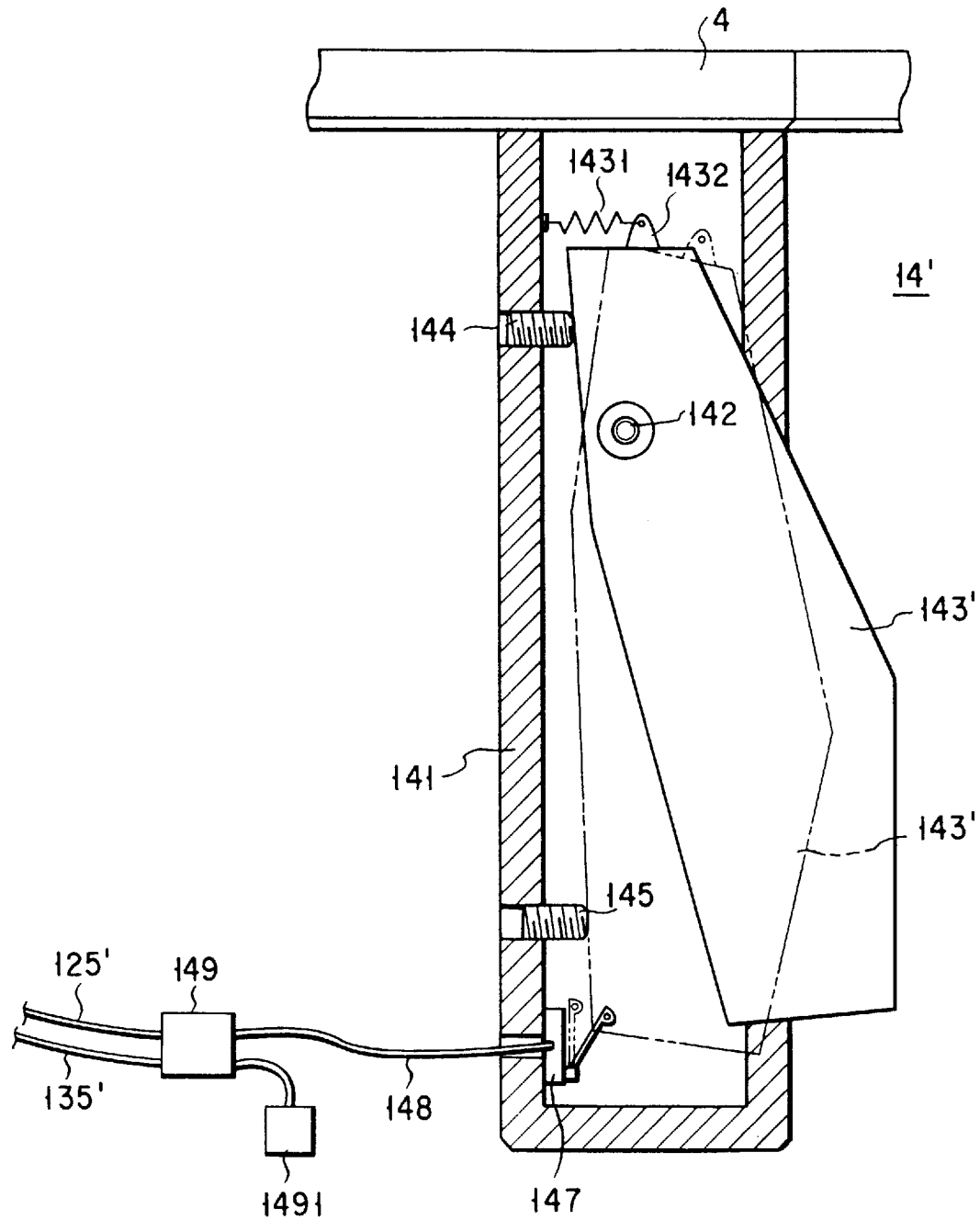
F I G. 15

MICROSCOPE STAGE

BACKGROUND OF THE INVENTION

1. Field of the Invention

This invention relates to a microscope stage on which a to-be-observed sample is disposed and which is moved in one direction or two directions (X-Y direction).

2. Description of the Related Art

Generally, a drive mechanism for moving a sample to a desired observation position is disposed on the microscope stage on which the sample is placed. Conventionally, a combination of a rack and pinion is used as the drive mechanism. In the microscope stage using the above drive mechanism, the assembling accuracy and the working accuracy of the rack and pinion exert a large influence on the driving accuracy of the stage.

However, for example, undulation of the rack and eccentricity of the pinion may occur according to the manufacturing accuracy of the rack and pinion and a sufficiently high degree of parallelization cannot be attained according to the assembling accuracy in some cases. In such cases, the degree of engagement between the rack and pinion varies and the engagement becomes tight or loose. Therefore, the stage cannot be smoothly moved and the movement of the stage becomes non-uniform.

In recent years, microscopes are used in the process for examining semiconductor wafers and liquid crystal panels. The semiconductor wafers and liquid crystal panels to be examined become large, and with an increase in the size thereof, it is more strongly required to increase the size of the stage for placing the to-be-examined sample thereon. In order to increase the size of the stage for the examining operation, it is necessary to make the rack long. However, in order to smoothly move the stage by use of the long rack, it is necessary to manufacture the long rack with high precision. Further, in order to keep constant the degree of engagement between the rack and pinion over the entire length of the rack, it is required to assemble them to accurately set the rack parallel to the moving direction of the stage.

However, even if the working accuracy of the long rack is further enhanced, it is almost impossible to completely eliminate the undulation of the rack or the like. Further, even if the assembling accuracy is further enhanced, it is extremely difficult to assemble the rack and pinion so as to accurately set the rack parallel to the moving direction of the stage. Further, in the drive mechanism constructed by the rack and pinion, the teeth thereof wear away after it is used and wear particles may fall on the semiconductor wafer which is a to-be-examined sample. This may cause a defective product when the examined sample is manufactured as the product.

Further, the rack may protrude from the stage in some cases according to the position and construction of the movement operating handle in the microscope. In this case, the rack gradually protrudes as it moves in one direction towards the stage and finally substantially the whole portion of the rack protrudes from the stage. By this protrusion, the hand of the operator will collide with the rack to degrade the positional precision of the rack or injure the hand of the operator in some cases.

In order to solve the above problem, the mechanisms disclosed in U.S. Pat. No. 5,228,357 and Jpn. Pat. Appln. KOKAI Publication No. 61-198206 are considered. The mechanisms have a structure using a straight rail having no tooth portion and a friction wheel instead of the drive mechanism constructed by the rack and pinion.

However, even with the above structure, the undulation of the rail and the eccentricity of the friction wheel may occur, and the degree of flatness of the mounting surface of the rail and the degree of parallelization of the rail with respect to the moving direction of the stage cannot be made sufficiently high in some cases. In the above case, like the mechanism constructed by the rack and pinion, the degree of engagement between the rail and the friction wheel becomes high or low to make the movement of the stage non-uniform. At the same time, the rail and the friction wheel will wear away and the friction wheel will slip, thereby making it impossible to smoothly move the stage. Further, it has the same problem as that caused in the drive mechanism constructed by the rack and pinion in respect to the protrusion of the rail and an increase in the length of the rail caused by the enlargement of the stage.

SUMMARY OF THE INVENTION

An object of this invention is to provide a microscope stage which can be smoothly moved and stably operated.

According to the invention there is provided a microscope stage comprising: an upper stage and a lower stage provided on a preset microscope and overlapped on each other in a vertical direction, the upper stage being disposed to move in a straight direction with respect to the lower stage; a pair of pulleys disposed on one of the upper stage and the lower stage and arranged with a preset distance in a direction parallel to the movement direction of the upper stage; and an endless driving force transmission member stretched between the pair of pulleys and reciprocally moved between the pulleys.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a cross sectional view showing the structure of the clutch lever operating portion;

FIG. 12 is a view showing a microscope on which an inverted lens-barrel or erected lens-barrel can be selectively mounted;

FIG. 15 is a view showing the structure of a clutch-lever operating section.

DETAILED DESCRIPTION OF THE PREFERRED EMBODIMENTS

Figure 1:
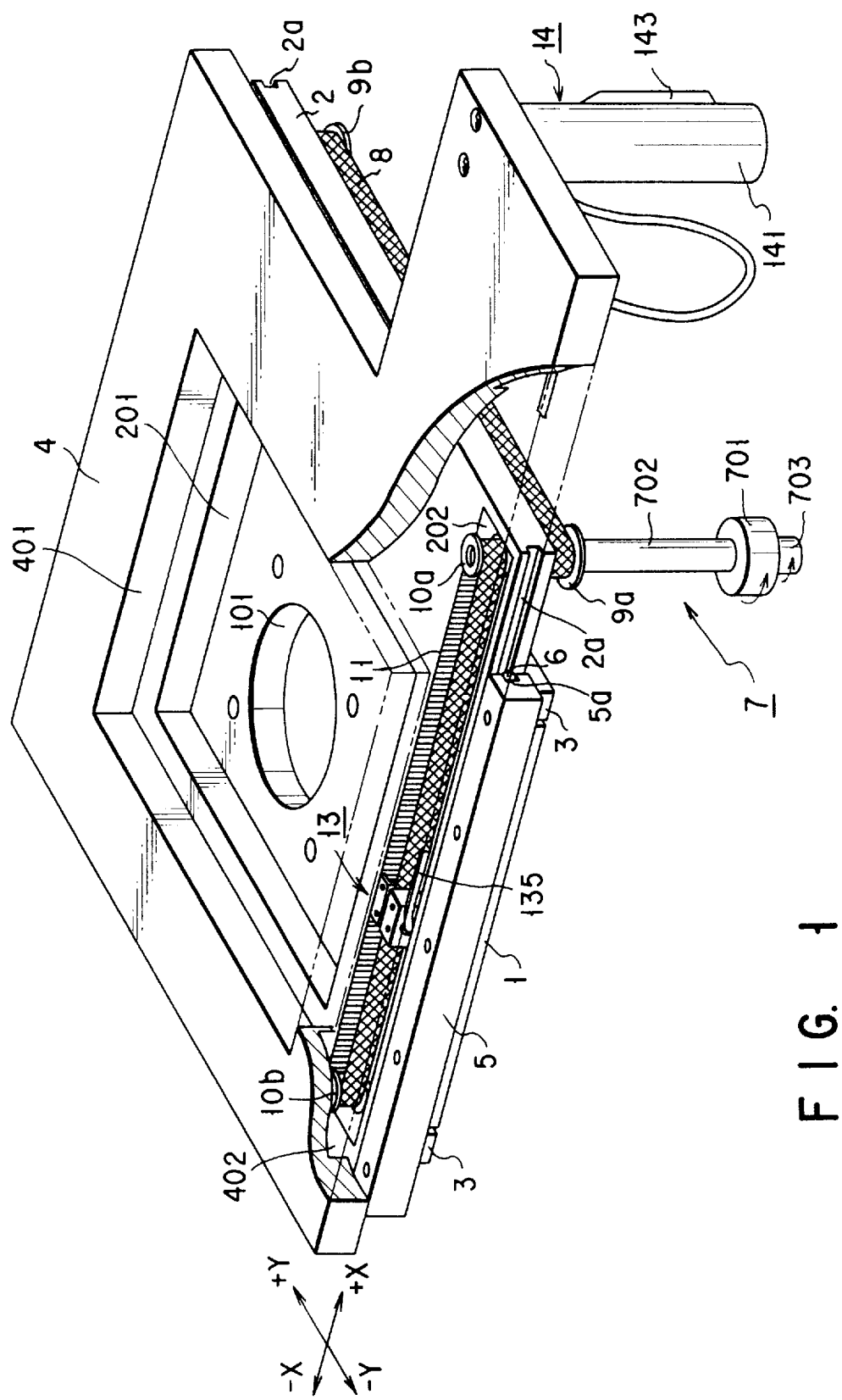
FIG. 1 is a view showing the structure of a microscope stage according to a first embodiment of this invention.
Figure 2:
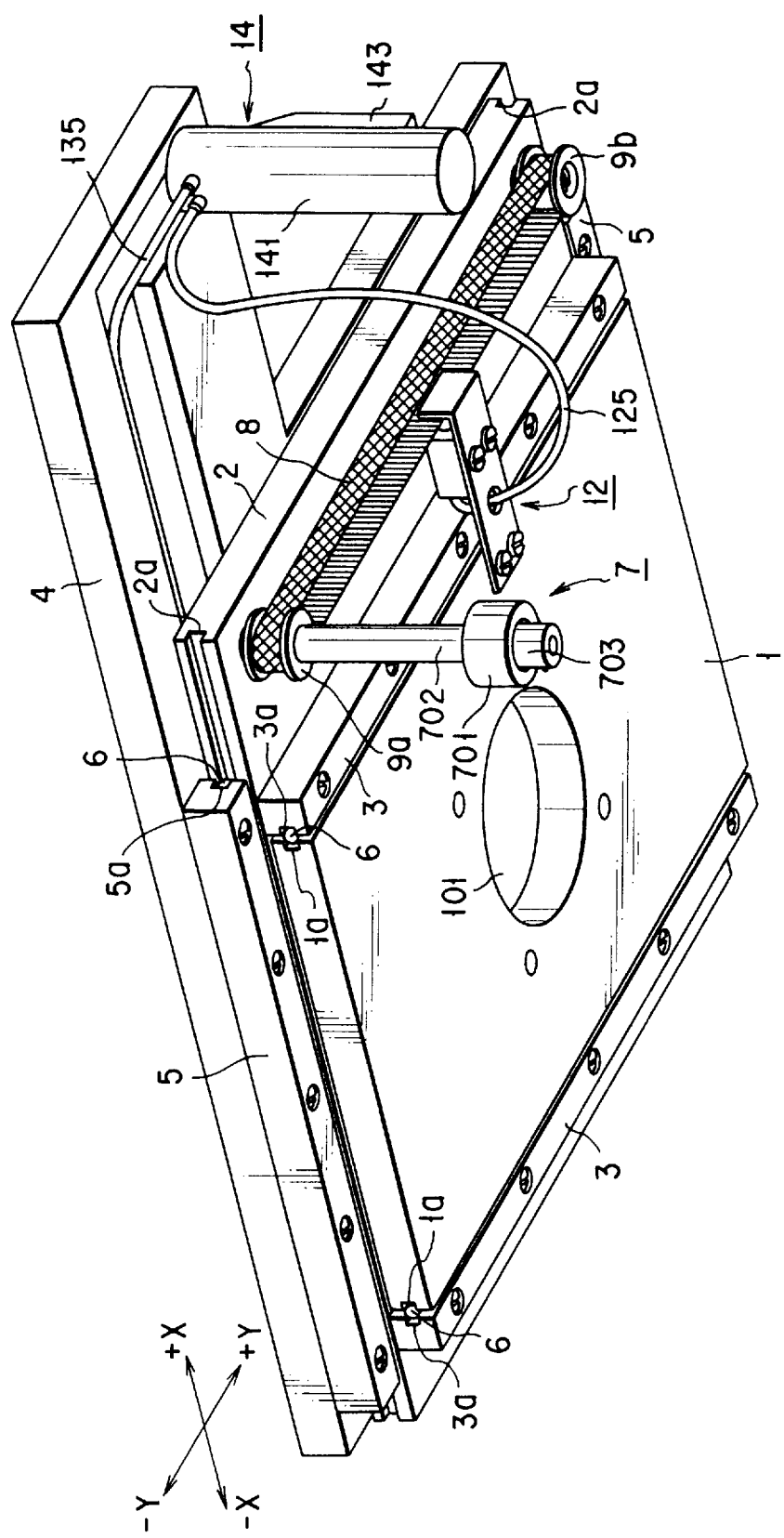
FIG. 2 is a view showing the structure of a microscope stage according to a first embodiment of this invention.

FIGS. 1 and 2 are views showing the structure of a microscope stage according to a first embodiment of this invention, FIG. 1 is a perspective view with partly cut-away portion as viewed from above, and FIG. 2 is a perspective view as viewed from below. The stage is used as a part of a microscope which is not shown. The stage is used to linearly carry a to-be-observed sample in X and Y directions intersecting each other.

A stage base 1 is fixed on the main body of the microscope (not shown). A circular through hole 101 is formed in the central portion of the stage base 1. Guide grooves 1a, 1a are formed in two opposite side surfaces of the stage base 1 along the side surfaces.

An intermediate stage 2 is disposed on the stage base 1. A rectangular through hole 201 is formed in the central portion of the intermediate stage 2. Columnar guides 3, 3 disposed to face the side surfaces of the stage base 1 which have the guide grooves 1a, 1a formed therein are integrally formed with the intermediate stage 2 on the under surface of the intermediate stage 2. By forming the guides 3, 3, it becomes possible to linearly move the intermediate stage 2 in the Y-axis direction with respect to the stage base 1 along the guide grooves 1a, 1a of the stage base 1.

The guides 3, 3 have guide grooves 3a, 3a facing the guide grooves 1a, 1a of the stage guide 1 and formed in the inner walls thereof. By inserting rollers (or balls) 6 between the guide grooves 1a and 3a, the smooth movement of the guides 3, 3 along the guide grooves 1a, 1a or the smooth movement of the intermediate stage 2 is attained.

Guide grooves 2a, 2a are formed in the two opposite side surfaces of the intermediate stage 2 intersecting the longitudinal direction of the guides 3, 3. Further, a stage main body 4 used for mounting a sample is disposed on the intermediate stage 2. A rectangular through hole 401 is formed in the central portion of the stage main body 4. Columnar guides 5, 5 disposed to face the side surfaces of the intermediate stage 2 which have the guide grooves 2a, 2a formed therein are integrally formed with the stage main body 4 on the under surface of the stage main body 4. By forming the guides 5, 5, it becomes possible to linearly move the stage main body 4 in the X-axis direction with respect to the intermediate stage 2 along the guide grooves 2a, 2a of the intermediate stage 2.

The guides 5, 5 have guide grooves 5a, 5a facing the guide grooves 2a, 2a of the intermediate stage 2 and formed in the inner walls thereof. By inserting rollers (or balls) 6 between the guide grooves 2a and 5a, the smooth movement of the guides 5, 5 along the guide grooves 2a, 2a or the smooth movement of the stage main body 4 is attained.

Thus, the stage base 1 is used as a lower stage and the intermediate stage 2 is used as an upper stage so as to permit the intermediate stage 2 to linearly move in the Y-axis direction with respect to the fixed stage base 1. Further, the intermediate stage 2 is used as a lower stage and the stage main body 4 is used as an upper stage so as to permit the stage main body 4 to linearly move in the X-axis direction with respect to the intermediate stage 2.

A pair of pulleys 9a, 9b are arranged with a preset distance in a direction along one of the guides 3, 3, that is, in a direction parallel to the moving direction of the intermediate stage 2 on the side edge portion of the under surface of the intermediate stage 2 on which the guide 3 is formed. An endless ring-form flat belt 8 is stretched between the pulleys 9a and 9b to reciprocally travel between the pulleys 9a and 9b.

An operation handle 7 is provided on the pulley 9a which is one of the paired pulleys 9a and 9b. The operation handle 7 includes an outer operating shaft 702 having a knob portion 701 and an inner operating shaft 703 inserted into the outer operating shaft 702 along the axis of the outer operating shaft 702. The pulley 9a is mounted on and formed integrally with the front end portion of the outer operating shaft 702, and when the knob portion 701 is rotated, the outer operating shaft 702 is rotated to rotate the pulley 9a and drive only the belt 8 in the same direction as the rotating direction of the knob portion 701 by means of the pulleys 9a and 9b.

As shown in FIG. 1, a groove portion 202 is formed in the side edge portion corresponding in position to the guide 5 (which is one of the guides closer to the pulley 9a) mounted on the stage main body 4 on the upper surface of the intermediate stage 2. A pair of pulleys 10a, 10b are arranged on the opposite end portions of the guide portion 202 with a preset distance along a direction parallel to the moving direction of the stage main body 4. An endless ring-form flat belt 11 is stretched between the pulleys 10a and 10b to reciprocally travel between the pulleys 10a and 10b. The pulleys 10a, 10b and the belt 11 are provided in a space defined by the groove portion 202 in the upper surface of the intermediate stage 2 and a groove portion 402 in the under surface of the stage main body 4 as will be described later.

The front end portion of the inner operation shaft 703 of the operation handle 7 is mounted on and integrally formed with the pulley 10a which is one of the paired pulleys 10a and 10b. When the inner operating shaft 703 is rotated, the pulley 10a is rotated to drive only the belt 11 in the same direction as the rotating direction of the inner operation shaft 703 by means of the pulleys 10a and 10b.

A clutch portion 12 is provided between the stage base 1 and the belt 8. The clutch portion 12 is mounted on the stage base 1 side, and when a clutch lever operating portion 14 which will be described later is operated, the forward path side or backward path side of the belt 8 is fixed or released from the fixed state.

Figure 3:
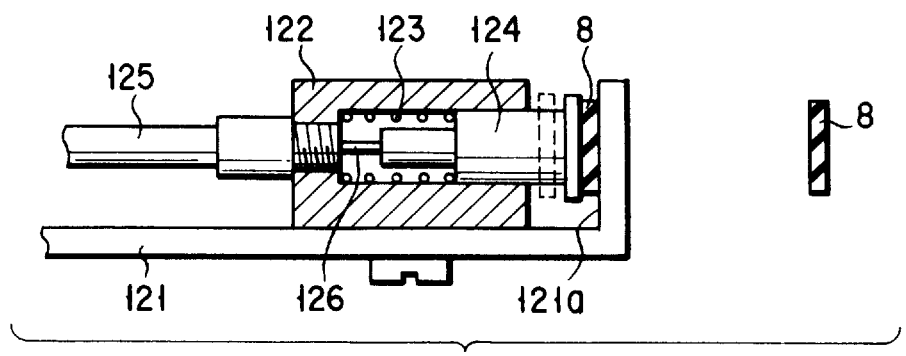
FIG. 3 is a cross sectional view showing the structure of the clutch portion.

FIG. 3 is a cross sectional view showing the structure of the clutch portion 12. One end portion of a plate 121 in the clutch portion 12 is fixed on the under surface of the stage base 1 and the other end portion thereof is bent in a vertical direction to form a bent portion 121a. The belt 8 is positioned to face the bent portion 121a. The side surfaces of the bent portion 121a are surrounded by the ring-form endless belt 8 and the bent portion 121a is disposed in position near the inner surface of a portion of the belt 8 which is set closer to the bent portion 121a.

A cylindrical plunger guide 122 is mounted on the plate 121. A spring 123 is disposed in the hollow cylindrical portion of the plunger guide 122 and a plunger 124 is inserted into the plunger guide 122 so as to freely slide in the plunger guide 122 by an action of the spring 123. With this structure, the belt 8 can always be pressed against the surface of the bent portion 121a of the plate 121 by the front end portion of the plunger 124 by the biasing force of the spring 123. Further, the surface of the front end portion of the plunger 124 which is set in contact with the belt 8 is made flat. Thus, the bent portion 121a and the belt 8 are pressed against each other so as to keep the belt 8 in the fixed state with respect to the plate 121.

An outer wire 125 lead out from the clutch lever operating portion 14 which will be described later is connected to a portion of the plunger guide 122 on one side opposite to the side on which the plunger 124 is inserted. An inner wire 126 is disposed in the outer wire 125 and connected to the plunger 124 in the plunger guide 122. The plunger 124 is moved in a direction against the biasing force of the spring 123, that is, in the left direction by the pulling force of the inner wire 126 in the left direction in the drawing. As a result, the state in which the belt 8 is pressed against the surface of the bent portion 121a of the plate 121 by the front end portion of the plunger 124 can be released and the belt 8 and the plate 121 is disconnected from each other.

As shown in FIG. 1, a clutch portion 13 is disposed between the intermediate stage 2 and the stage main body 4. The clutch portion 13 is mounted on the stage main body 4 side, and when the clutch lever operating portion 14 which will be described later is operated, the forward path side or backward path side of the belt 8 is fixed or released from the fixed state.

Figure 4:
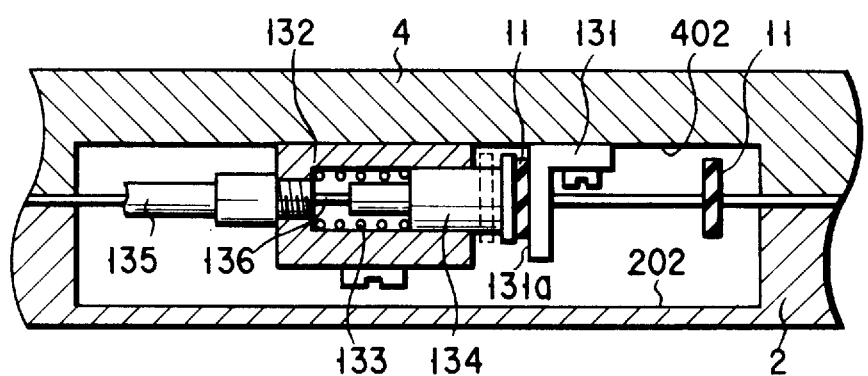
FIG. 4 is a cross sectional view showing the structure of the clutch portion.

FIG. 4 is a cross sectional view showing the structure of the clutch portion 13. As shown in FIG. 1, the groove portion 402 corresponding to the groove portion 202 of the intermediate stage 2 is formed in the stage main body 4. The clutch portion 13 is disposed in a space defined by the groove portions 402 and 202. The clutch portion 13 has an "L"-shaped pad member 131 disposed on the bottom surface of the groove portion 402. The belt 11 is set in position to face a bent portion 131a of the pad member 131. The side surfaces of the bent portion 131a are surrounded by the belt 11 and the bent portion 131a is disposed in position near the inner surface of a portion of the belt 11 which is set closer to the bent portion 131a.

A cylindrical plunger guide 132 is mounted on the bottom surface of the groove portion 402. A spring 133 is disposed in the hollow cylindrical portion of the plunger guide 132 and a plunger 134 is inserted into the plunger guide 132 so as to freely slide in the plunger guide 132 by an action of the spring 133. With this structure, the belt 11 can always be pressed against the surface of the bent portion 131a of the pad member 131 by the front end portion of the plunger 134 by the biasing force of the spring 133. Further, the surface of the front end portion of the plunger 124 which is set in contact with the belt 11 is made flat. Thus, the bent portion 131a and the belt 11 are pressed against each other so as to keep the belt 11 in the fixed state with respect to the pad member 131.

An outer wire 135 lead out from the clutch lever operating portion 14 which will be described later is connected to a portion of the plunger guide 132 on one side opposite to the side on which the plunger 134 is inserted. An inner wire 136 is disposed in the outer wire 135 and connected to the plunger 134 in the plunger guide 132. The plunger 134 is moved in a direction against the biasing force of the spring 133, that is, in the left direction by the pulling force of the inner wire 136 in the left direction in the drawing. As a result, the state in which the belt 11 is pressed against the surface of the bent portion 131a of the pad member 131 by the front end portion of the plunger 134 can be released and the belt 11 and the pad member 131 is disconnected from each other. The belt 11 is permitted to be freely driven with respect to the pad member 131.

FIG. 5 is a cross sectional view showing the structure of the clutch lever operating portion 14. The clutch lever operating portion 14 has a structure having a columnar grip 141 fixed on the under surface of the stage main body 4. In the grip 141, a clutch lever 143 is rotatably supported by a supporting member 142. The inner wire 126 in the outer wire 125 and the inner wire 136 in the outer wire 135 are fixed to the upper end portion of the clutch lever 143 by a screw 143a and a screw 143b, respectively. When the clutch lever 143 is rotated around the supporting member 142, pulling force is applied to the inner wires 126 and 136.

The supporting point of the clutch lever 143, that is, the position of the supporting member 142 is greatly deflected towards the connection node side of the clutch lever 143 and the inner wires 126, 136. For this reason, only if the operator (the observer) grasps the grip 141 and the clutch lever 143 with a small grasping power, he can rotate the clutch lever 143 from the position indicated by the solid line in FIG. 5 to the position indicated by the two-dot-dash line, and as a result, preset pulling force can be applied to the inner wires 126, 136. When the rotating operation is not effected, rotation of the clutch lever 143 in the counterclockwise direction by the pulling force of the inner wire 126 is prevented by a stopper 144. When the rotating operation is effected, rotation of the clutch lever 143 in the clockwise direction is prevented by a stopper 145.

Next, the operation of the microscope stage with the above structure is explained. First, in a case where the clutch lever 143 of the clutch lever operating portion 14 shown in FIG. 5 is not rotated, the clutch lever 143 is set in position indicated by the solid line shown in FIG. 5 and pulling force by the clutch lever 143 is not applied to the inner wires 126 and 136.

In this state, the clutch portion 12 shown in FIG. 3 causes the front end portion of the plunger 124 to press the belt 8 against the bent portion 121a of the plate 121 by the biasing force of the spring 123 to keep the belt 8 in the fixed state with respect to the plate 121. Likewise, the clutch portion 13 shown in FIG. 4 causes the front end portion of the plunger 134 to press the belt 11 against the bent portion 131a of the pad member 131 by the biasing force of the spring 133 to keep the belt 11 in the fixed state with respect to the pad member 131.

If, in this state, the knob portion 701 of the operating handle 7 shown in FIGS. 1 and 2 is rotated to rotate the outer operation shaft 702, the belt 8 is driven via the pulley 9a. By the driving of the belt 8, the intermediate stage 2 is finely moved in the Y-axis direction with respect to the fixed stage base 1, since the clutch portion 12 side is fixed. With this movement, the stage main body 4 on the intermediate stage 2 is also finely moved in the Y-axis direction. At this time, since a portion of the belt 8 lying on the clutch portion 12 side is fixed, the intermediate stage 2 and the stage main body 4 are finely moved in the +Y direction shown in FIGS. 1 and 2 when the knob portion 701 is rotated in the clockwise direction, and the intermediate stage 2 and the stage main body 4 are finely moved in the −Y direction shown in FIGS. 1 and 2 when the knob portion 701 is rotated in the counterclockwise direction.

If the inner operation shaft 703 of the handle 7 is rotated, the belt 11 is driven via the pulley 10a. By the driving of the belt 11, the stage main body 4 is finely moved in the X-axis direction with respect to the intermediate stage 2, since the clutch portion 13 side is fixed. At this time, since a portion of the belt 11 lying on the clutch portion 13 side is fixed, the stage main body 4 is finely moved in the +X direction shown in FIGS. 1 and 2 when the knob portion 703 is rotated in the clockwise direction, and the stage main body 4 is finely moved in the −X direction shown in FIGS. 1 and 2 when the knob portion 703 is rotated in the counterclockwise direction.

Thus, if the operator selectively rotates the outer operation shaft 702 and the inner operation shaft 703 of the operating handle 7, the stage main body 4 can be finely moved in the Y-axis direction and X-axis direction, thus making it possible to move a sample (not shown) on the stage main body 4 to a desired position.

Next, if the operator grasps the grip 141 of the clutch lever operating portion 14 and rotates the clutch lever 143 from the position indicated by the solid line in FIG. 5 to the position indicated by the two-dot-dash line, pulling force is applied to the inner wires 126, 136. In the clutch portion 12 shown in FIG. 3, the plunger 124 is moved to the position indicated by the broken lines in a direction against the biasing force of the spring 123 by the pulling force of the inner wire 126 in the left direction and the fixed state of the belt 11 is released.

Thus, since the connection between the stage base 1 and the belt 8 and the connection between the stage main body 4 and the belt 11 are released, it is possible to directly move the intermediate stage 2 in the Y-axis direction and move the stage main body 4 in the X-axis direction without using the belts 8, 11. Therefore, the operator can smoothly effect the rough positioning of a sample (not shown) on the stage main body 4 without receiving the movement resistance of the operating handle 7 and the belts 8, 11. At this time, the operator can roughly move the intermediate stage 2 and the stage main body 4 in the Y-axis direction by grasping the grip 141 of the clutch lever operating portion 14 and moving the same in the Y-axis direction. Likewise, the operator can roughly move the stage main body 4 in the X-axis direction by grasping the grip 141 of the clutch lever operating portion 14 and moving the same in the X-axis direction.

After this, the operator stops grasping of the grip 141 of the clutch lever operating portion 14 and sets the clutch lever 143 back to the position indicated by the solid line in FIG. 5. As a result, the preset pulling force by the inner wires 126, 136 is released and the connection between the stage base 1 and the belt 8 and the connection between the stage main body 4 and the belt 11 can be made again by the clutch portions 12, 13. Therefore, it becomes possible to finely move the intermediate stage 2 and the stage main body 4 again by operating the operating handle 7 as described before.

Figure 6:
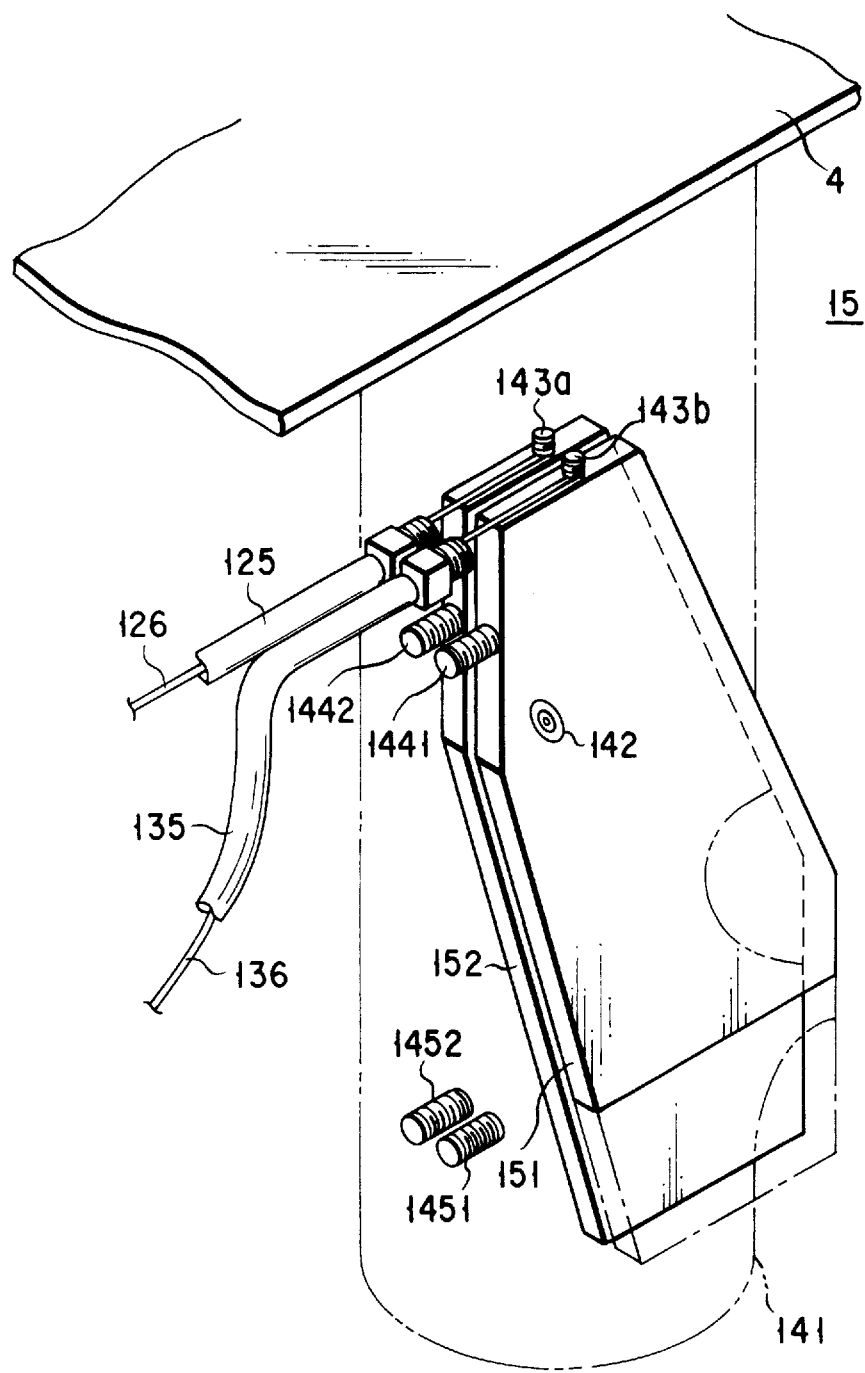
FIG. 6 is a perspective view showing the structure of a clutch lever operating portion which is a modification of the clutch lever operating portion shown in FIG. 5.

FIG. 6 is a perspective view showing the structure of a clutch lever operating portion 15 which is a modification of the clutch lever operating portion 14 shown in FIG. 5. In FIG. 6, portions which are the same as those in FIG. 5 are denoted by the same reference numerals. Clutch levers 151 and 152 in the clutch lever operating portion 15 are so supported as to be independently and freely rotated by the supporting member 142 in the grip 141. The upper end portions of the clutch levers 151 and 152 are respectively connected to the inner wire 136 of the outer wire 135 and the inner wire 126 of the outer wire 125.

As indicated by the solid line in FIG. 6, since the clutch lever 151 is shorter than the clutch lever 152, the operator can easily and independently operate the clutch levers 151 and 152. It is possible to make the lengths of the clutch levers 151 and 152 equal to each other (by extending the lower portion of the clutch lever 151 as indicated by the one-dot-dash lines in FIG. 6), and even in this case, the operator can independently operate the clutch levers 151 and 152. Further, it is possible to form cutout portions in the specified positions of the clutch levers 151 and 152 of the same length as indicated by the two-dot-dash lines in FIG. 6. In this case, since the positions of the cutout portions of the clutch levers 151 and 152 are different from each other, the operator can easily and independently operate the clutch levers 151 and 152.

As shown in FIG. 3, the outer wire 125 and the inner wire 126 are connected to the clutch portion 12, and as shown in FIG. 4, the outer wire 135 and the inner wire 136 are connected to the clutch portion 13. When the clutch lever 152 is rotated around the supporting member 142, pulling force is applied to the inner wire 126, and when the clutch lever 151 is rotated around the supporting member 142, pulling force is applied to the inner wire 136. When the clutch levers 151, 152 are not operated, rotations thereof in the counterclockwise direction by the tensions of the inner wires 136, 126 are prevented by stoppers 1441, 1442. Further, when the clutch levers 151, 152 are operated, rotations thereof in the clockwise direction are prevented by stoppers 1451, 1452.

When the clutch levers 151, 152 of the clutch lever operating portion 15 shown in FIG. 6 are not operated, no pulling force is applied to the inner wires 136, 126. In this state, the belts 8 and 11 are set in the fixed state. If the operator grasps the grip 141 of the clutch lever operating portion 15 and rotates the clutch lever 152, preset pulling force is applied to the inner wire 126 and the fixed state of the belt 8 is released as described above. Further, if the operator rotates the clutch lever 151, preset pulling force is applied to the inner wire 136 and the fixed state of the belt 11 is released as described above.

Thus, since the connection between the stage base 1 and the belt 8 and the connection between the stage main body 4 and the belt 11 can be independently released, the intermediate stage 2 can be directly moved in the Y-axis direction without using the belt 8 and only the stage main body 4 can be directly moved in the X-axis direction without using the belt 11. The operator can roughly move the intermediate stage 2 and the stage main body 4 only in the Y-axis direction by grasping the grip 141 of the clutch lever operating portion 15 and moving the same in the Y-axis direction with only the clutch lever 152 set in the rotated state. Likewise, the operator can roughly move only the stage main body 4 in the X-axis direction by grasping the grip 141 of the clutch lever operating portion 14 and moving the same in the X-axis direction with only the clutch lever 151 set in the rotated state. Thus, the operator can effect the rough positioning of the sample placed on the stage main body 4.

The above operations are effected when it is desired to roughly move the stage main body 4 in only one of the X-axis and Y-axis directions. Of course, if the operator grasps the grip 141 of the clutch lever operating portion 15 and rotates both of the clutch levers 152 and 151, the fixed state of both of the belts 8 and 11 can be released. In this case, it becomes possible to roughly move the stage main body 4 in both of the X-axis and Y-axis directions.

The connection between the stage base 1 and the belt 8 and the connection between the stage main body 4 and the belt 11 can be independently released not only by providing two clutch levers in the clutch lever operating portion as shown in FIG. 6 but also by using the following structure. For example, the tension of one of the inner wires 126 and 136 is adjusted to be weaker than the tension of the other inner wire with the clutch lever 143 of FIG. 5 set in the non-rotated state. In FIG. 5, 1261 indicates a state in which the inner wire 126 is stretched with the tension weaker than that of the inner wire 136.

With the above tension adjustment, one of the inner wires 126 and 136 whose tension is set stronger than that of the other inner wire is pulled when the operator operates the clutch lever 143 and the clutch lever is rotated by a small amount. As a result, the wire associated with the clutch portion connected to the pulled inner wire is released, and if the clutch portion is the clutch portion 12, it becomes possible to roughly move the intermediate stage 2 and the stage main body 4 only in the Y-axis direction, and if the clutch portion is the clutch portion 13, it becomes possible to roughly move the stage main body 4 only in the X-axis direction.

If the operator further rotates the clutch lever 143 from the above state, one of the inner wires 126 and 136 whose tension is set weaker than that of the other inner wire is also pulled. As a result, the wire associated with the clutch portion connected to the pulled inner wire is also released and it becomes possible to roughly move the stage main body 4 in both of the X-axis and Y-axis directions. The above-described structure can be realized by independently adjusting the degrees of tightness of the inner wires 126 and 136 provided in the grip 141 shown in FIG. 5 by use of a fixing member 146, for example.

As described above, in the microscope stage according to the first embodiment, the pulleys 9a, 9b and the belt 8 and the pulleys 10a, 10b and the belt 11 are respectively provided on the intermediate stage 2 and the stage main body 4 on the stage base 1. Therefore, since the intermediate stage 2 and the stage main body 4 can be linearly driven by the reciprocal movement of the endless belts 8 and 11 stretched between the pulleys 9a and 9b and the pulleys 10a and 10b, the stage main body 4 can be moved in the X-axis and Y-axis directions. Thus, the mechanism for driving the stage, that is, the pulleys 9a, 9b and the belt 8 and the pulleys 10a, 10b and the belt 11 are disposed on the under surfaces of the intermediate stage 2 and the stage main body 4. Therefore, a problem that the rack or rail protrudes from the stage caused in the mechanism which is constructed by a combination of the rack and pinion or the rail and friction wheel and is conventionally used as the stage driving mechanism can be solved.

Further, according to the structure shown in the first embodiment, since high working accuracy required for the rack and pinion is not required, the structure can be easily manufactured, and since the assembling adjustment is not required, the assembling can be easily attained. Further, since the creak peculiar to the rack and pinion can be eliminated and the slip peculiar to the rail and friction wheel can be eliminated, the movement of the stage for positioning the sample can be smoothly effected and the stable operability can be attained. In addition, in a case where the stage is made larger, it is possible to easily cope with the case by increasing the distances between the pulleys 9a and 9b and between the pulleys 10a and 10b and using endless belts suitable for the distances.

Further, since the fixed state of the belts 8, 11 can be released simply by operation of the clutch lever 14, the rough movement of the stage 4 can be smoothly effected without receiving the resistance of movement of the belts 8, 11 when the stage main body 4 is directly moved without operating the operating handle 7 at the time of rough positioning of the sample.

In the first embodiment, the mechanism constructed by a combination of the flat belt 8 (11) and the pulleys 9a, 9b (10a, 10b) is explained, but it is also possible to use a mechanism constructed by a combination of a "VI"-shaped belt and pulleys, a toothed belt and pulleys, or a wire and pulleys.

Figure 7A:
FIGS. 7A to 7D are longitudinal cross sections and lateral cross sections of belts which can be used in the microscope stage.
Figure 7B:
Figure 7C:
Figure 7D:
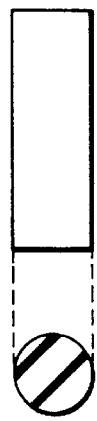
Figure 7E:
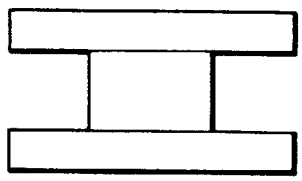
FIGS. 7E to 7I are external views of pulleys which can be used in the microscope stage.
Figure 7F:
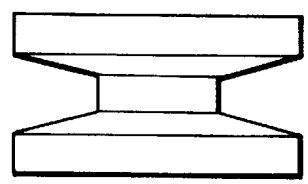
Figure 7G:
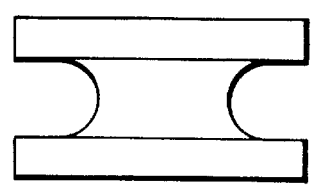
Figure 7H:
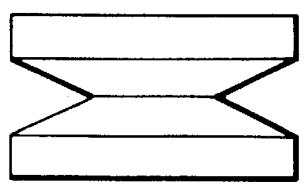
Figure 7I:
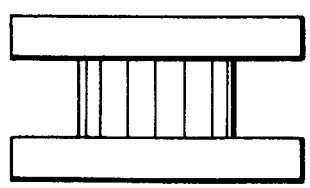

FIGS. 7A to 7D are longitudinal cross sections and lateral cross sections of belts which can be used in the microscope stage, and FIGS. 7E to 7I are external views of pulleys which can be used in the microscope stage. FIG. 7A shows a flat belt, FIG. 7B shows a toothed belt, FIG. 7C shows a "VI"-shaped belt, and FIG. 7D shows a circular belt. FIG. 7E shows a pulley suitably used for driving the flat belt shown in FIG. 7A, the toothed belt shown in FIG. 7B and the circular belt shown in FIG. 7D. FIG. 7F shows a pulley suitably used for driving the "VI"-shaped belt shown in FIG. 7C, and FIG. 7G shows a pulley suitably used for driving the circular belt shown in FIG. 7D. FIG. 7H shows a pulley suitably used for driving a wire which is not shown. According to the above combinations, the belts or wires and the pulleys can stably engage with each other. Further, in the microscope stage according to this invention, belts and pulleys of shapes other than those of the belts shown in FIGS. 7A to 7D and the pulleys shown in FIGS. 7E to 7H can be used.

Particularly, when the toothed belt is used, the belt can be more stably moved since the slip occurring between the belt and the pulley can be eliminated. In this case, a pulley (shown in FIG. 7I) having toothed portions engaging with the toothed portions of the toothed belt is used. Further, instead of the above belts, a wire can be used as described before.

Figure 8:
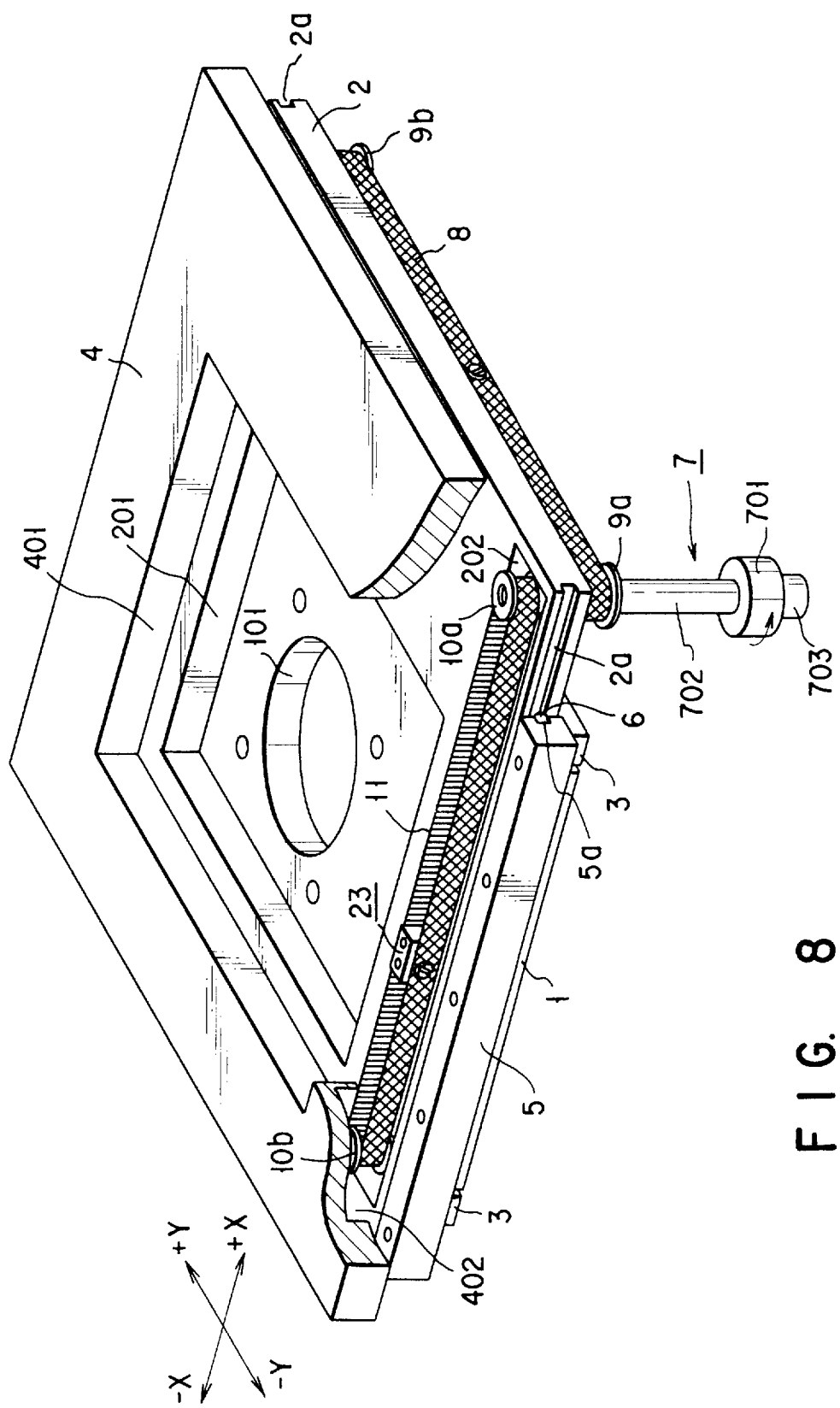
FIG. 8 is a view showing the structure of a microscope stage according to a second embodiment of this invention.
Figure 9:
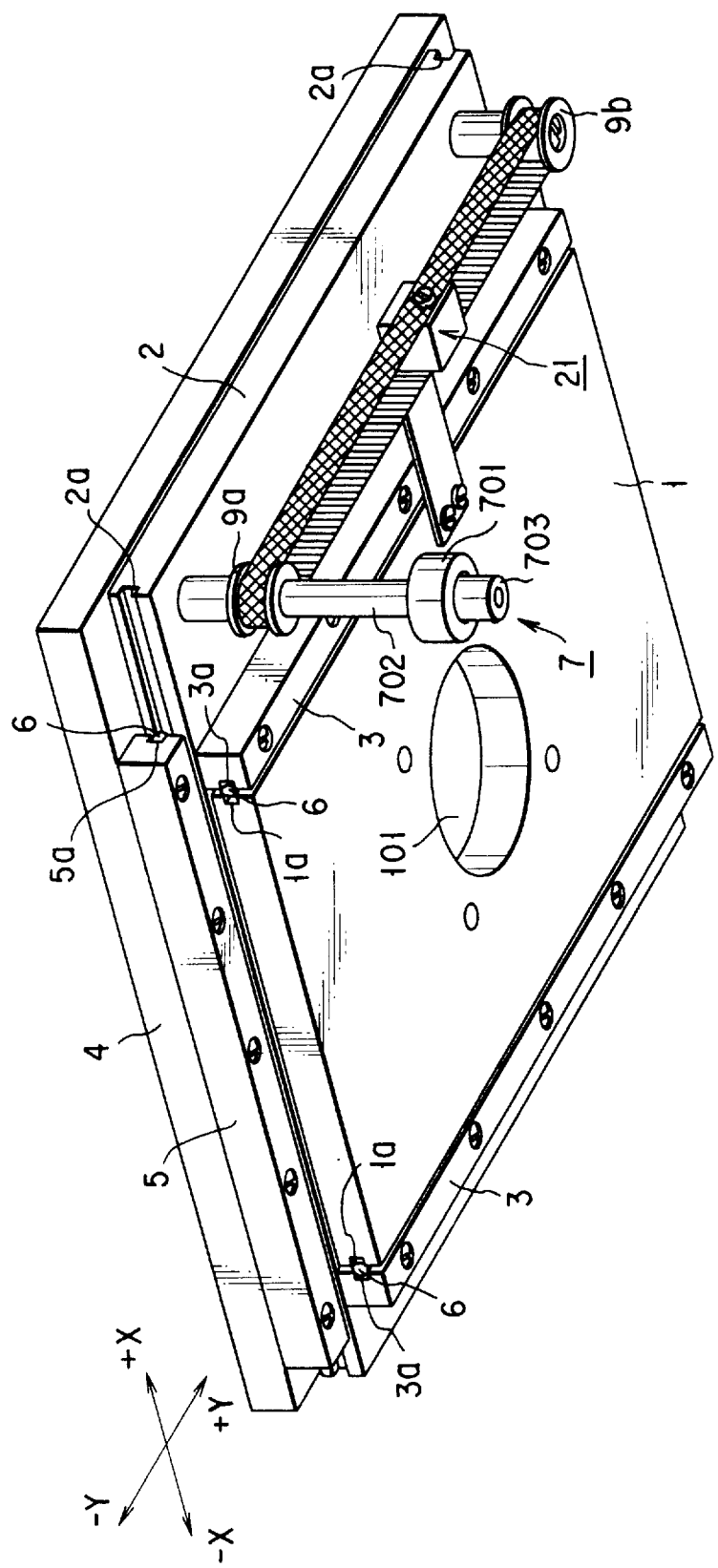
FIG. 9 is a view showing the structure of a microscope stage according to a second embodiment of this invention.

FIGS. 8 and 9 are views showing the structure of a microscope stage according to a second embodiment of this invention, FIG. 8 is a perspective view with partly cut-away portion as viewed from above, and FIG. 9 is a perspective view as viewed from below. In FIGS. 8 and 9, portions which are the same as those of FIGS. 1 and 2 are denoted by the same reference numerals. As shown in FIG. 9, a belt fixing portion 21 is provided on a stage base 1, and as shown in FIG. 8, a belt fixing portion 23 is provided on a stage main body 4.

Figure 10:
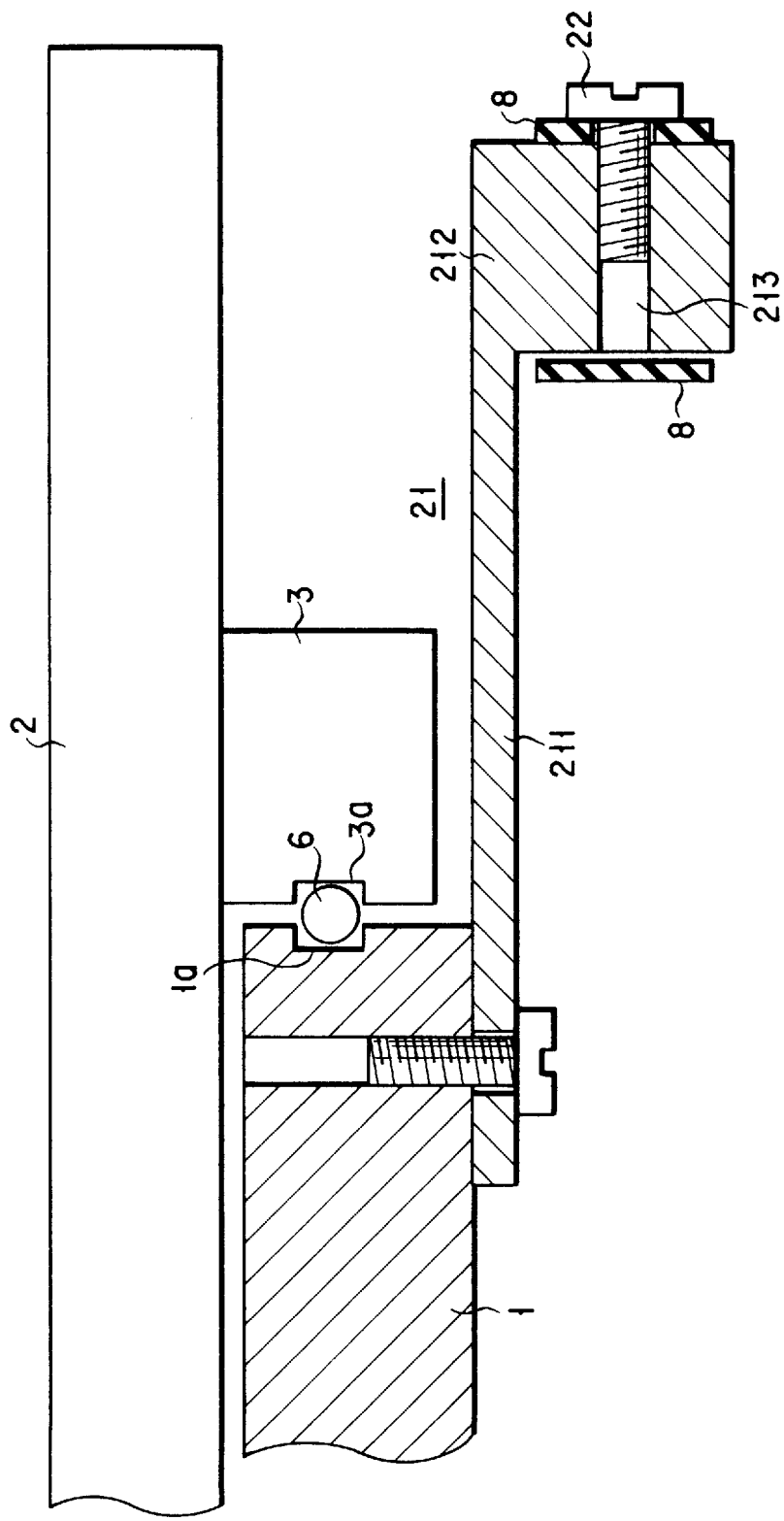
FIG. 10 is a cross sectional view showing the structure of the belt fixing portion.

FIG. 10 is a cross sectional view showing the structure of the belt fixing portion 21. The belt fixing portion 21 has a thick fixing main body 212 formed on the front end portion of a plate 211 and a threaded hole 213 penetrating from the outside of the fixing main body 212 to the inner side thereof is formed in the fixing main body 212. The front end portion of the plate 211 is fixed on the under surface of the stage base 1. The thick fixing main body 212 is disposed between belts 8, 8 stretched to travel in parallel between pulleys 9a and 9b and a screw 22 is screwed from the outside of the fixing main body 212 into the threaded hole 213 of the fixing main body 212 via the belt 8. With this structure, the belt 8 traveling outside the fixing main body 212, or the belt on the forward path side can be fixed on the fixing main body 212.

Figure 11:
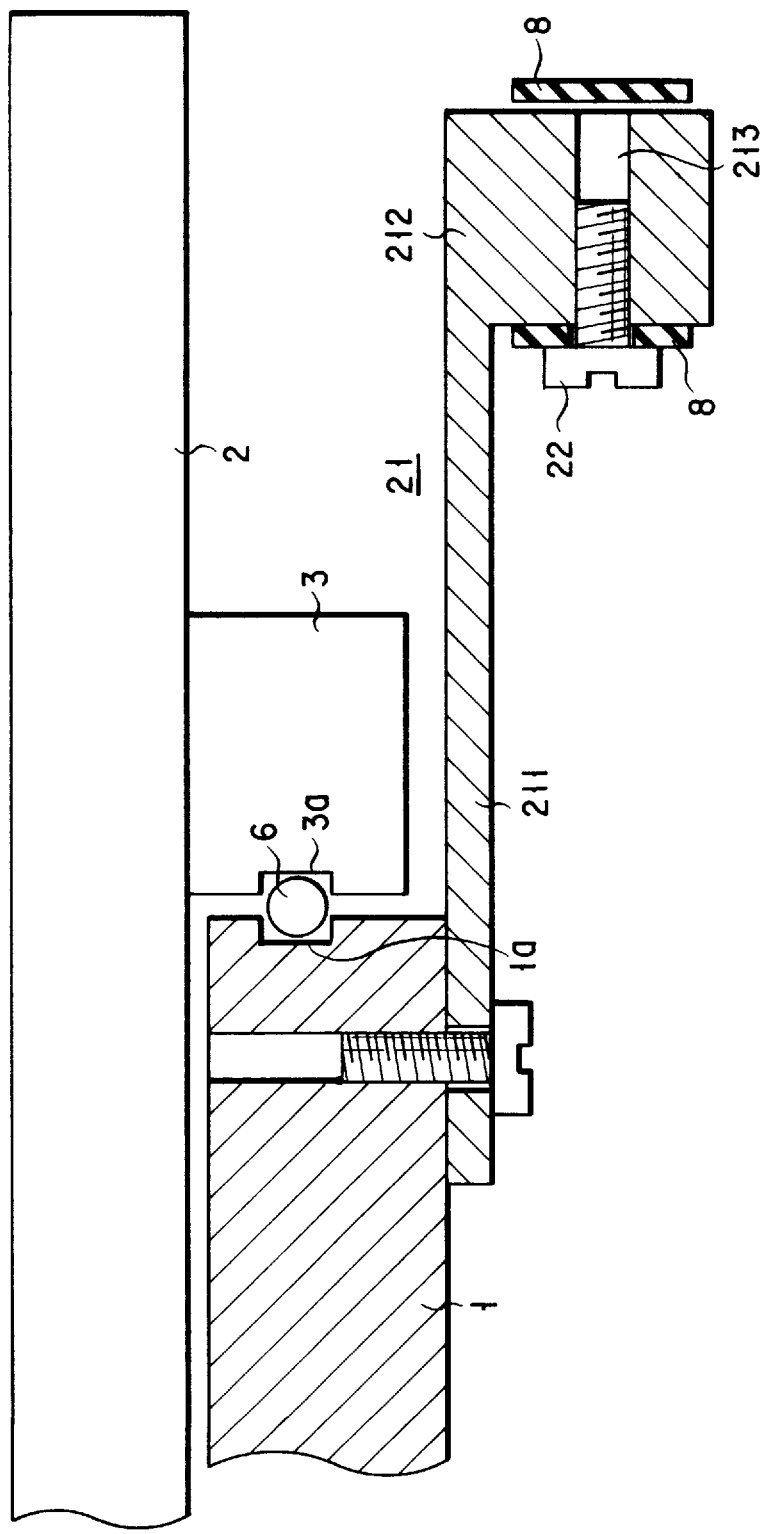
FIG. 11 is a cross sectional view also showing the structure of the belt fixing portion.

FIG. 11 is a cross sectional view also showing the structure of the belt fixing portion 21. In FIG. 11, portions which are the same as those of FIG. 10 are denoted by the same reference numerals. In the belt fixing portion 21, a screw 22 is screwed from the inner side of the fixing main body 212 into a threaded hole 213 of the fixing main body 212 via the belt 8. With this structure, the belt 8 traveling on the inner side of the fixing main body 212, for example, the belt on the backward path side can be fixed on the fixing main body 212.

As shown in FIG. 8, a belt fixing portion 23 is provided on the stage main body 4. The belt fixing portion 23 has the same structure as the belt fixing portion 21 shown in FIGS. 10 and 11 and can be used to selectively fix one of the forward path side and backward path side of belts 11, 11 stretched to travel in parallel between the pulleys 10a and 10b. In this case, the belt fixing portion 23 is mounted on the under surface of the stage main body 4.

Thus, if the outer operating shaft 702 is rotated by operating the knob portion 701 of the operating handle 7 with the belts 8 and 11 fixed by the respective belt fixing portions 21 and 23, the belt 8 is linearly driven via the pulley 9a so that the intermediate stage 2 can be moved in the Y-axis direction and the stage main body 4 can be moved in the Y-axis direction according to the movement of the intermediate stage. Further, if the inner operating shaft 703 of the handle 7 is rotated, the belt 11 is linearly driven via the pulley 11a so that the stage main body 4 can be moved in the X-axis direction.

Thus, since the stage main body 4 can be finely moved in the Y-axis and X-axis directions by selectively rotating the outer operating shaft 702 and inner operating shaft 703 in the operating handle 7, a sample (not shown) on the stage main body 4 can be moved to a desired position.

In this case, since the fixing position of the belt 8, 11 with respect to the fixing main body can be selectively changed to the forward path side or the backward path side of the belt in each of the belt fixing portion 21 and 23 as shown in FIGS. 10 and 11, the directions of movement of the stage main body 4 in the Y-axis and X-axis directions with respect to the directions of rotation of the outer operating shaft 702 and inner operating shaft 703 can be reversed. That is, for example, if the fixing positions of the belts 8, 11 on the respective fixing main bodies are changed from the fixing positions set in a state in which the directions of movement of the stage main body 4 in the Y-axis and X-axis directions correspond to the directions of rotation of the outer operating shaft 702 and inner operating shaft 703, the directions of movement of the stage main body 4 in the Y-axis and X-axis directions are set to correspond to the reverse directions of the directions of rotation of the outer operating shaft 702 and inner operating shaft 703. Thus, the directions of movement of the stage main body 4 in the Y-axis and X-axis directions with respect to the direction of operation of the operating handle 7 can be freely selected according to the requirement of the observer.

FIG. 12 is a view showing a microscope on which an inverted lens-barrel or erected lens-barrel can be selectively mounted. As shown in FIG. 12, a microscope stage 200 is mounted on a microscope main body 301 via a focus adjusting portion 302. The microscope stage 200 is vertically moved according to the vertical movement of the focus adjusting portion 302 moved by operating a focusing handle 203. A revolver 206 having an objective 205 mounted thereon is disposed on an arm 204 lying above the microscope stage 200.

When an erected lens-barrel 210a for obtaining an erected image is mounted on the microscope main body 301, the erected image moves in the +X or −X direction if the observer moves the stage in the +X or −X direction, respectively. Likewise, the erected image moves in the +Y or −Y direction if the observer moves the stage in the +Y or −Y direction, respectively. In other words, the image observed through the lens-barrel 210a moves in the same direction as the stage (or the sample) does. In this state, if the erected lens-barrel 210a is removed and an inverted lens-barrel 210b for obtaining an inverted image is mounted on the microscope main body 301, the inverted image moves in the −X or +X direction if the observer moves the stage in the +X or −X direction, respectively. Likewise, the inverted image moves in the −Y or +Y direction if the observer moves the stage in the +Y or −Y direction, respectively. Thus, the image observed moves in the direction opposite to the direction in which the sample does. The observer may feel that the movement of the image is unnatural.

Therefore, the observer changes the fixing positions of the belts 8, 11 with respect to the respective fixing main bodies as described before. In this case, if the observer operates the operating handle 7 in the same manner as when the erected lens-barrel 210a is mounted, the directions of movement of the stage main body 4 in the Y-axis and X-axis directions are reversed. However, the direction of movement of the inverted image obtained by use of the inverted lens-barrel 210b becomes the same as the direction of movement of the erected image obtained when the erected lens-barrel 210a is mounted. Therefore, even if the observer rotates the outer operating shaft 702 and inner operating shaft 703 of the operating handle 7 with the inverted lens-barrel 210b mounted in the same manner as when the erected lens-barrel 210a is mounted, the inverted image moves in the same direction as that of the erected image.

Figure 13:
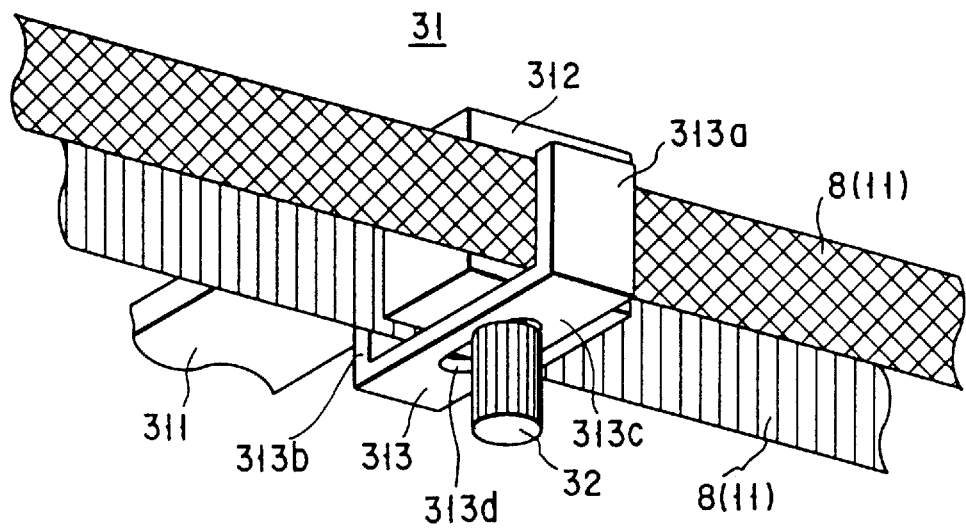
FIG. 13 is a view showing a modification of the belt fixing portion.

FIG. 13 is a view showing a modification of the belt fixing portion 21. In a belt fixing portion 31 shown in FIG. 13, a thick fixing main body 312 is formed on the front end portion of a plate 311. A threaded hole (not shown) is formed in the head portion of the fixing main body 312. By screwing a screw 32 into the threaded hole via a clutch member 313, the clutch member 313 can be fixed on the fixing main body 312 by means of the screw 32. In the clutch member 313, both end portions thereof are bent in the same direction to form holding portions 313a, 313b. Further, a long hole 313d into which the screw 32 is inserted is formed along the axial direction of the clutch member 313 in an intermediate portion 313c which lies below the fixing main body 312 and connects the holding portions 313a and 313b together.

The holding portions 313a, 313b of the clutch member 313 are respectively arranged on the forward path side and backward path side of the belt 8 (11). The clutch member 313 can be positioned by moving the long hole 313d in the axial direction with respect to the threaded hole and the clutch member 313 is fixed on the fixing main body 312 by tightening the screw 32 with the clutch member 313 set in a preset position. Thus, by variably changing the fixing position of the clutch member 313 with respect to the position in which the screw 32 is screwed, the distances between the fixing main body 312 and the holding portions 313a, 313b can be adjusted.

The belt fixing portion 31 with the above structure is used to fix the plate 311 on the stage base 1 (stage main body 4)

and set the fixing main body 312 between the belts 8, 8 (11, 11) traveling in parallel between the pulleys 9a and 9b (10a and 10b). In this state, one of the forward path side and the backward path side of the belt 8 (11) traveling between the holding portion 313a (313b) and the fixing main body 312 can be fixed by determining the fixing position of the screw 32 with respect to the long hole 313d. At this time, the belt 8 (11) can be fixed by causing the holding portion 313a to press the forward path side of the belt 8 (11), for example, against the fixing main body 312. On the other hand, the belt 8 (11) can be fixed by causing the holding portion 313b to press the backward path side of the belt 8 (11), for example, against the fixing main body 312.

Thus, with the above structure, one of the forward path side and backward path side of the belts 8, 8 (11, 11) can be selectively fixed by changing the fixing position of the screw 32 with respect to the long hole 313d of the clutch member 313. As a result, it becomes possible to change the direction of movement of the stage main body 4 in the Y-axis and X-axis directions with respect to the directions of rotation of the outer operating shaft 702 and inner operating shaft 703 of the operating handle 7 as required and the same effect as that of the belt fixing portion 21 shown in FIGS. 10 and 11 can be attained. Of course, it is possible to use the belts shown in FIGS. 7A to 7D, wires (not shown), pulleys shown in FIGS. 7E to 7I, and belts and pulleys of other shapes in the microscope stage of the second embodiment.

In the above embodiments, the structure with which the operator manually rotates the operating handle 7 to rotate the pulley is explained, but it is possible to make a structure in which the pulley is electrically driven by use of a motor (not shown). Further, in the above embodiments, the structure with which the wires 126, 136 are used to release the fixed state of the belts 8, 11 in the clutch portions 12, 13 is explained, but it is possible to incorporate direct operated electromagnetic solenoids which are well known in the art into the clutch portions 112, 13.

In this case, a cylindrical electromagnetic solenoid is provided instead of the spring 123 (133) in the plunger guide 122 (132) shown in FIG. 3 (FIG. 4) and the plunger 124 (134) formed of a magnetic material is movably disposed in the hollow portion of the electromagnetic solenoid. Further, a drive switch of the electromagnetic solenoid is mounted on the clutch lever operating portion 14 so as to permit the electromagnetic solenoid to be driven via the wire 126 (136). As a result, when the drive switch is set in the ON position, the electromagnetic solenoid is driven and the plunger 124 (134) presses the belt 8 (11) to fix the belt 8 (11). On the other hand, when the drive switch is set in the OFF position, the electromagnetic solenoid is not driven and the plunger 124 (134) does not press the belt 8 (11) so as to release the fixed state of the belt 8 (11).

Figure 14:
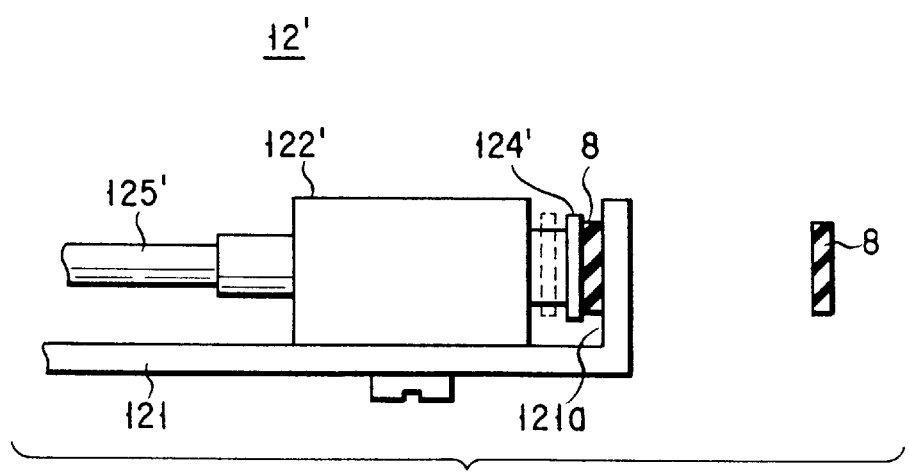
FIG. 14 is a view showing the structure of a clutch portion.

The clutch portion 12 shown in FIG. 3 may be replaced by a clutch portion 12' shown in FIG. 14. The clutch portion 12' differs from the clutch portion 12 in that an electromagnetic solenoid is used in place of the wire-drive mechanism. In FIG. 14, the component identical to those of the clutch portion 12 (FIG. 3) are designated at the same reference numerals as in FIG. 3.

As shown in FIG. 14, the clutch portion 12' comprises a solenoid 122' of the known type. The solenoid 122' has a coil and an electromagnet, either not shown. The solenoid 122' contains a coil spring (not shown). The coil spring applies a bias on a plunger 124' which extend through the solenoid 122' and which can move back and forth. Connected to the solenoid 122' is a lead wire 125' which extends from a clutch-lever operating section 14' (later described).

When the solenoid 122' is not driven, that is, when no drive current flows to the solenoid 122' through the lead wire 125', the plunger 124' keeps pressing the belt 8 onto the bent portion 121a of the plate 121 because the coil spring applies a bias on the plunger 124'. The belt 8 is therefore secured to the plate 121.

When a drive current flows to the solenoid 122' through the wire 125', the solenoid 122' is driven, compressing the coil spring. The plunger 124' is thereby moved to the left, against the bias of the coil spring. That is, the plunger 124' is moved from a position indicated by solid lines to a position indicated by broken lines, releasing the belt 8 from the bent portion 121a of the plate 121. As a result, the belt 8 is disconnected from the plate 121.

Except for the features described above the clutch portion 12' is identical in structure to the clutch portion 12 (FIG. 3). The clutch portion 13 shown in FIG. 4 can be replaced by a clutch portion 13' of the type shown in FIG. 14 in which an electromagnetic solenoid is used instead of the wire-drive mechanism.

The clutch-lever operating section 14 shown in FIG. 5 may be replaced by the clutch-lever operating section 14' illustrated in FIG. 15. In FIG. 15, the components identical to those of the clutch section 14 (FIG. 5) are denoted at the same reference numerals as in FIG. 5.

As shown in FIG. 15, the clutch-lever operating section 14' comprises a clutch lever 143' which has a hook 1432 on its top. A tension spring 1431 connects the hock 1432 to a grip 141. The clutch lever 143' remains in the position indicated by solid lines in FIG. 15 unless it is rotated, because of the bias the tension spring 1431 applies on the clutch lever 143'.

Provided inside the grip 141 and at the lower part thereof is a micro-switch 147. The micro-switch 147 is turned on when the clutch lever 143' is rotated to the position indicated by two-dot-dash lines in FIG. 15. A signal line 148 extends from the micro-switch 147, passes through a hole made in the grip 141 and connected to a controller 149. The controller 149 is connected to a power supply 1491.

The controller 149 turns on the clutch portions 12' and 13' in response to an ON signal supplied from the micro-switch 147. It turns off the with the clutch portions 12' and 13' in response to an OFF signal supplied from the micro-switch 147. More specifically, when the micro-switch 147 is turned on, the clutch portion 12' operates such that the solenoid 122' is driven and the plunger 124' is pulled to the position indicated by broken lines in FIG. 14, and the clutch portion 13' operates exactly in the same way as the clutch portion 12'.

When the operator grasps the clutch lever 143', the micro-switch 147 is turned on. The solenoids of both clutch sections 12' and 13' are driven, both clutches are released. When the clutch lever 143' is released, it moves to the initial position, where it turns off the micro-switch 147. The solenoids of the clutch portions 12' and 13' are no longer driven, whereby both clutches secure the belts 8 and 11 to the plate 121 and the pad member 131, respectively.

The clutch-lever operating section 14' shown in FIG. 15 can be used in place of the clutch-lever operating section 15 illustrated in FIG. 6. In this case, two clutch levers 143', two hooks 1432, two micro-switches 147, two lead wires 148, two stoppers 144 and two stoppers 145 need to be provided, so that the operator may operates two clutch levers independently. The lead wire 125' is connected to the clutch portion 12', and the lead wire 135' to the clutch portion 13'. The controller 149 supplies control signals via the lead lines 125' and 135' to the two clutch portions, in accordance with the operation of the two micro-switches.

In the above embodiments, the microscope stage having the intermediate stage 2 and the stage main body 4 disposed on the stage base 1 and permitting the stage main body 4 to be linearly moved in the X-axis and Y-axis directions is explained, but it is possible to use the above-described mechanism for a stage in which the intermediate stage 2 is omitted, the stage main body 4 is disposed on the stage base 1 and the stage main body 4 is permitted to linearly move only in one direction.

As described above, according to this invention, the upper stage which is disposed to be movable relative to the lower stage is linearly driven by the reciprocal movement of the endless belt which is a driving force transmission member stretched between a pair of pulleys and can be moved in a preset direction. Therefore, the movement of the upper stage for positioning the sample can be smoothly effected and the stable operability can be attained. Further, since fixed state of the driving force transmission member can be released by use of the clutch member if required, the upper stage can be smoothly moved without receiving the resistance of movement of the driving force transmission member or the like even when the upper stage is moved for rough positioning of the sample. Further, since the rack and rail used in the conventional microscope stage can be omitted, the working and assembling can be made simple and protrusion of the rack and rail from the stage caused by the movement of the stage can be prevented.

Since one of the forward path side and the backward path side of the endless driving force transmission member stretched between a pair of pulleys can be selectively fixed, the direction of movement of the upper stage with respect to the rotating direction of the operating handle can be reversed as required and the direction of movement of the upper stage with respect to the rotating direction of the operating handle can be freely selected.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A microscope stage comprising:
   an upper stage and a lower stage provided on a preset microscope and overlapped on each other in a vertical direction, said upper stage being disposed to move in a straight direction with respect to said lower stage;
   a pair of pulleys disposed on one of said upper stage and said lower stage and arranged with a preset distance in a direction parallel to the movement direction of said upper stage;
   an endless driving force transmission member stretched between said pair of pulleys and reciprocally moved between said pulleys; and
   a clutch member provided on the other of said upper and lower stages for clutching said endless driving force transmission member and unclutching said transmission member on one of a forward path side and backward path side of said transmission member.

2. A microscope stage according to claim 1, wherein said clutch member includes a plunger, a plunger guide of cylindrical form having a hollow portion in which said plunger is movably disposed, and a spring member disposed in the hollow portion of said plunger guide to press said plunger against said driving force transmission member by the biasing force of said spring member.

3. A microscope stage according to claim 2, further comprising operating means for operating said plunger to move in a direction away from said driving force transmission member against the biasing force of said spring member.

4. A microscope stage according to claim 1, wherein said driving force transmission member comprises one of a flat belt, "V"-shaped belt, toothed belt and wire.

5. A microscope stage according to claim 2, wherein the surface of a portion of said plunger which is set in contact with said driving force transmission member is made flat.

6. A microscope stage according to claim 1, wherein said clutch member includes a plunger formed of magnetic material, an electromagnetic solenoid of cylindrical form having a hollow portion in which said plunger is movably disposed, for pressing said plunger against said driving force transmission member by the electromagnetic force thereof, and operating means for controlling the driving of said electromagnetic solenoid.

7. A microscope stage comprising:
   a stage section having an upper stage and a lower stage provided on a preset microscope and overlapped on each other in a vertical direction, and an intermediate stage disposed between said upper and lower stages, said intermediate stage being disposed to move in a straight direction with respect to said lower stage and said upper stage being disposed to move in a straight direction perpendicular to said straight direction with respect to said intermediate stage;
   a first pair of pulleys disposed on said intermediate stage and arranged with a preset distance in a direction parallel to the movement direction of said intermediate stage with respect to said lower stage;
   a second pair of pulleys disposed on said intermediate stage and arranged with a preset distance in a direction parallel to the movement direction of said upper stage;
   a first endless driving force transmission member stretched between said first pair of pulleys and reciprocally moved between said pulleys;
   a second endless driving force transmission member stretched between said second pair of pulleys and reciprocally moved between said pulleys;
   a first clutch member provided on a position along said first endless driving force transmission member for clutching said first endless driving force transmission member and unclutching said transmission member on one of a forward path side and backward path side of said first endless driving force transmission member;
   a second clutch member provided on a position along said second endless driving force transmission member for clutching said second endless driving force transmission member and unclutching said transmission member on one of a forward path side and backward path side of said second endless driving force transmission member.

8. A microscope stage according to claim 7, wherein each of said first and second clutch members includes a plunger, a plunger guide of cylindrical form having a hollow portion in which said plunger is movably disposed, and a spring member disposed in the hollow portion of said plunger guide to press said plunger against said driving force transmission member by the biasing force of said spring member.

9. A microscope stage according to claim 8, further comprising operating means for simultaneously operating said plungers of said first and second clutch members to move in a direction away from said driving force transmission members against the biasing forces of said spring members.

10. A microscope stage according to claim 8, further comprising operating means for selectively operating said plungers of said first and second clutch members to move in a direction away from said driving force transmission members against the biasing forces of said spring members.

11. A microscope stage according to claim 7, wherein said driving force transmission member comprises one of a flat belt, "VI"-shaped belt, toothed belt and wire.

12. A microscope stage according to claim 8, wherein the surface of a portion of said plunger which is set in contact with said driving force transmission member is made flat.

13. A microscope stage according to claim 7, wherein each of said first and second clutch members includes a plunger formed of magnetic material, an electromagnetic solenoid of cylindrical form having a hollow portion in which said plunger is movably disposed, for pressing said plunger against said driving force transmission member by the electromagnetic force thereof, and operating means for controlling the driving of said electromagnetic solenoid.

14. A microscope stage comprising:
   an upper stage and a lower stage provided on a preset microscope and overlapped on each other in a vertical direction, said upper stage being disposed to move in a straight direction with respect to said lower stage;
   a pair of pulleys disposed on one of said upper stage and said lower stage and arranged with a preset distance in a direction parallel to the movement direction of said upper stage;
   an endless driving force transmission member stretched between said pair of pulleys and reciprocally moved between said pulleys; and
   fixing means provided on the other of said upper and lower stages for selectively fixing one of a forward path side and backward path side of said driving force transmission member.

15. A microscope stage according to claim 14, wherein said fixing means includes a fixing main body disposed to be surrounded by said driving force transmission member, and a screw for fixing said driving force transmission member on said fixing main body when screwed into said fixing main body via one of the forward path side and backward path side of said driving force transmission member.

16. A microscope stage according to claim 14, wherein said fixing means includes a fixing main body disposed to be surrounded by said driving force transmission member, a pad member having two pad portions respectively disposed on the forward path side and backward path side of said driving force transmission member to press said driving force transmission member against said fixing main body and a coupling member for coupling said two pad portions to each other, and a screw for tightening said pad member which presses said driving force transmission member on one of the forward path side and backward path side thereof to said fixing main body, to fix said driving force transmission member on said fixing main body.

17. A microscope stage according to claim 14, wherein said driving force transmission member comprises one of a flat belt, "V"-shaped belt, toothed belt and wire.

* * * * *